(12) United States Patent
Ryan et al.

(10) Patent No.: US 8,870,487 B2
(45) Date of Patent: Oct. 28, 2014

(54) CAR WASH WATER BRUSH HANDLE

(76) Inventors: Patrick T. Ryan, Madison Heights, MI (US); Donald A. Klemmer, Plymouth, MI (US)

( * ) Notice: Subject to any disclaimer, the term of this patent is extended or adjusted under 35 U.S.C. 154(b) by 308 days.

(21) Appl. No.: 13/607,150

(22) Filed: Sep. 7, 2012

(65) Prior Publication Data

US 2013/0153069 A1    Jun. 20, 2013

Related U.S. Application Data

(63) Continuation-in-part of application No. 13/434,614, filed on Mar. 29, 2012.

(60) Provisional application No. 61/469,748, filed on Mar. 30, 2011.

(51) Int. Cl.
| | |
|---|---|
| *A46B 11/06* | (2006.01) |
| *F16L 25/00* | (2006.01) |
| *A46B 5/00* | (2006.01) |
| *B05C 17/00* | (2006.01) |
| *B60S 3/00* | (2006.01) |
| *B60S 3/04* | (2006.01) |

(52) U.S. Cl.
CPC ............... *F16L 25/00* (2013.01); *A46B 5/0075* (2013.01); *A46B 11/063* (2013.01); *B05C 17/00* (2013.01); *B60S 3/00* (2013.01); *B60S 3/047* (2013.01); *A46B 2200/3046* (2013.01)
USPC .......................................... 401/289; 401/277

(58) Field of Classification Search
CPC ....... B60S 3/045; B60S 3/027; A46B 11/063; A46B 5/0075; A46B 2200/3046
USPC .......... 401/277, 278, 289, 171–175; 239/754, 239/525, 526, 527, 528, 530, 532, 570, 571, 239/572; 138/45, 46; 137/535, 540, 798
See application file for complete search history.

(56) References Cited

U.S. PATENT DOCUMENTS

| 5,487,529 | A  | * | 1/1996  | Newville ...................... 251/148 |
| 6,481,041 | B1 | * | 11/2002 | Ingram ........................... 15/111 |
| 6,786,431 | B2 | * | 9/2004  | Song .............................. 239/526 |

* cited by examiner

*Primary Examiner* — David Walczak
*Assistant Examiner* — Jennifer C Chiang
(74) *Attorney, Agent, or Firm* — Donald J. Ersler

(57) ABSTRACT

A car wash water brush handle includes a wobble tube and a piston tube. The wobble tube includes an entrance hose fitting, a reinforcing hose, a flexible boot and an exit hose fitting. The piston tube includes a tube body, a piston, a piston rod, a compression spring, an exit reinforcing hose and an exit hose fitting. When water flows through the tube body, the piston rod is forced into entrance hose fitting through pressure against the piston. The piston rod prevents the flexible portion of the flexible boot from being damaged during operation. The water flows through the tube body at a pressure of 90 psi. A brush head is threaded onto the exit hose fitting. A water hose is threaded into one end of a hand grip tube and the entrance hose fitting is threaded into the other end of the hand grip tube.

7 Claims, 10 Drawing Sheets

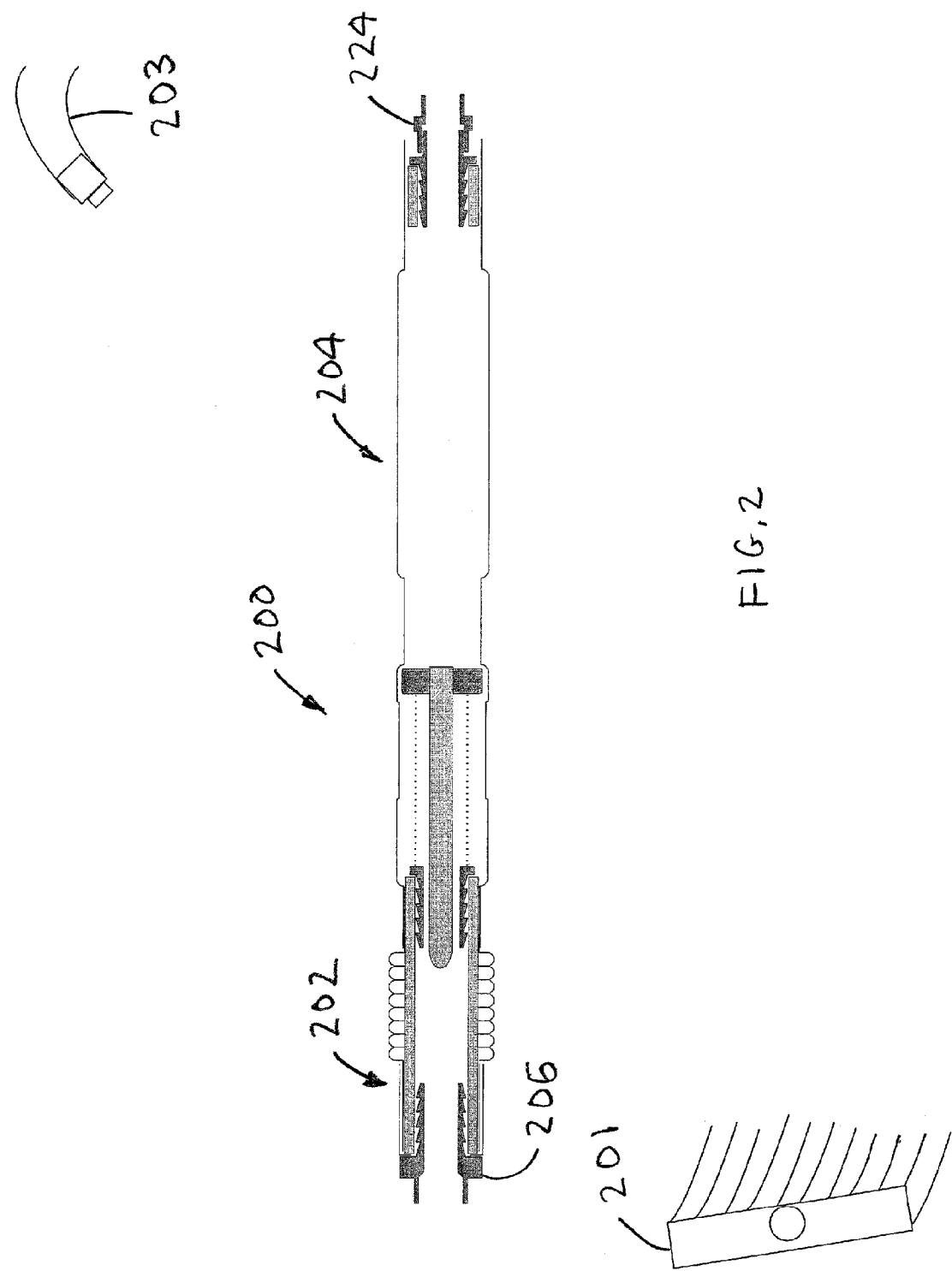

CAR WASH WATER BRUSH HANDLE

This is continuation in part application, which claims priority from nonprovisonal patent application Ser. No. 13/434,614 filed on Mar. 29, 2012, which claims priority from provisional application No. 61/469,748 filed on Mar. 30, 2011, both disclosures are incorporated by reference.

TECHNICAL FIELD & BACKGROUND

Traditional self-serve car washes have a rigid flow-thru handle for a foam brush. The customer can use the brush and handle to clean a car. The conventional rigid handle has the foam brush attached to it and is readily available to a customer with or without payment. Besides having to pay for proper use of the foam brush there are many ways for a customer to misuse and abuse the brush without payment. Due to the nature of a self-serve car wash, which is often unattended, a customer can decide if he will make a proper payment and use of the foam brush. If the customer decides to utilize a brush without payment, there is nothing stopping them from doing so. The conventional foam system and rigid flow-thru handle has always frustrated owners and managers of self-serve car washes. A confrontational or otherwise uncomfortable conversation between an owner and a customer can occur when a customer is misusing and abusing a brush without payment. The nature of a self-serve car wash is that it is selling a timed and unattended service. Therefore, misuse and abuse of the rigid foam brush handle has historically cost car wash owners lost revenue and profits.

Traditional rigid flow-thru foam brush handles are susceptible to customer abuse and misuse. The customer is usually informed (by one or more signs that are often not read) to first rinse the brush of any dirt that may be on the brush from a previous customer's use. This instruction is necessary because when a brush has been used improperly by a preceding customer it could possibly have dirt and other abrasive matter trapped within its bristles. The traditional foam brush system and handle can be misused and abused in a variety of ways. It can be used dry on wheels, used to sweep a pick-up truck bed, used as a snow brush and even used to clean a vehicle's painted surface. As a wet brush, after time has expired on a meter, many customers continue to spread loaded foam onto a vehicle and detail every nook and cranny again without proper payment. Also, there are foam dipper users who pick-up foam from the floor and continue to use the brush on tires, wheels, chrome and other vehicle areas without payment. There also are tag teamers (two people) users who use a high pressure wand and the foam brush (dry and without foam) simultaneously. The service selection switch on the money and time meter box allows only one tool within a car wash bay to be activated at a time. When the brush and the high pressure wand are being utilized simultaneously the foam brush is being used without proper payment and chemicals. The traditional rigid foam brush handle allows for a variety of improper use and abuse because of the very nature of its design.

The present invention is a self-serve car wash flow through foam activated mechanical brush handle that is flexible at the brush end so that the brush is rendered unusable until the time usage of the brush is purchased and a foam brush cycle is selected. Once this occurs, the foam begins to flow through the handle and it becomes rigid and fully useful to safely clean a vehicle's surface.

The car wash foam brush handle renders the actual brush head that is used for cleaning and attached to the car wash foam brush handle inoperable until a customer inserts payment into a timing meter and selects the "foam brush" as a paid service. The car wash foam brush handle attaches to a foam brush head with bristles that then wobbles, bends and flops back and forth when a customer attempts to use it in an inactive or unpaid for condition. Each time scrubbing pressure is applied to the car wash foam brush handle without payment the car wash brush flexes away from a surface to be cleaned. When a customer decides to insert the proper payment the car wash foam brush handle becomes activated and locks into a rigid condition and becomes fully useful.

A car wash water brush handle is activated by water instead of foam. The car wash water brush includes a different design for operation at higher pressure. A car wash foam brush handle is operated at a pressure of 50 psi and the car wash water brush handle is operated at a pressure of 90 psi.

The present invention generally relates to a car wash foam brush handle. More specifically, the invention is a mechanical car wash foam brush handle that is only operable and useful when paid for by the self-serve car wash customer with foam flowing through it.

It is an object of the present invention to provide a mechanical car wash foam brush handle that prevents the misuse and abuse of the car wash brush. It is an object of the present invention to provide a car wash foam brush handle that utilizes an extendible internal piston to ensure that a user pays for one or more car wash brush services before using the foam brush.

It is an object of the present invention to provide a car wash foam brush handle that increases a self-serve car wash's revenue.

What is really needed is a car wash foam brush handle that prevents unpaid misuse and abuse of the car wash brush that utilizes an extendible internal piston to ensure that a user pays for the car wash brush before use that increases a self-serve car wash's revenue.

It is a final object of the present invention to provide a car wash water brush handle, which is operated at a pressure of 90 psi.

BRIEF DESCRIPTION OF THE DRAWINGS

The present invention will be described by way of exemplary embodiments, but not limitations, illustrated in the accompanying drawing in which like references denote similar elements, and in which:

FIG. 2 is a partially exploded side view of a car wash foam brush handle, a brush and a foam hose in accordance with the present invention.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms comprising", "having" and "including" are synonymous, unless the context dictates otherwise.

Figure 1A:
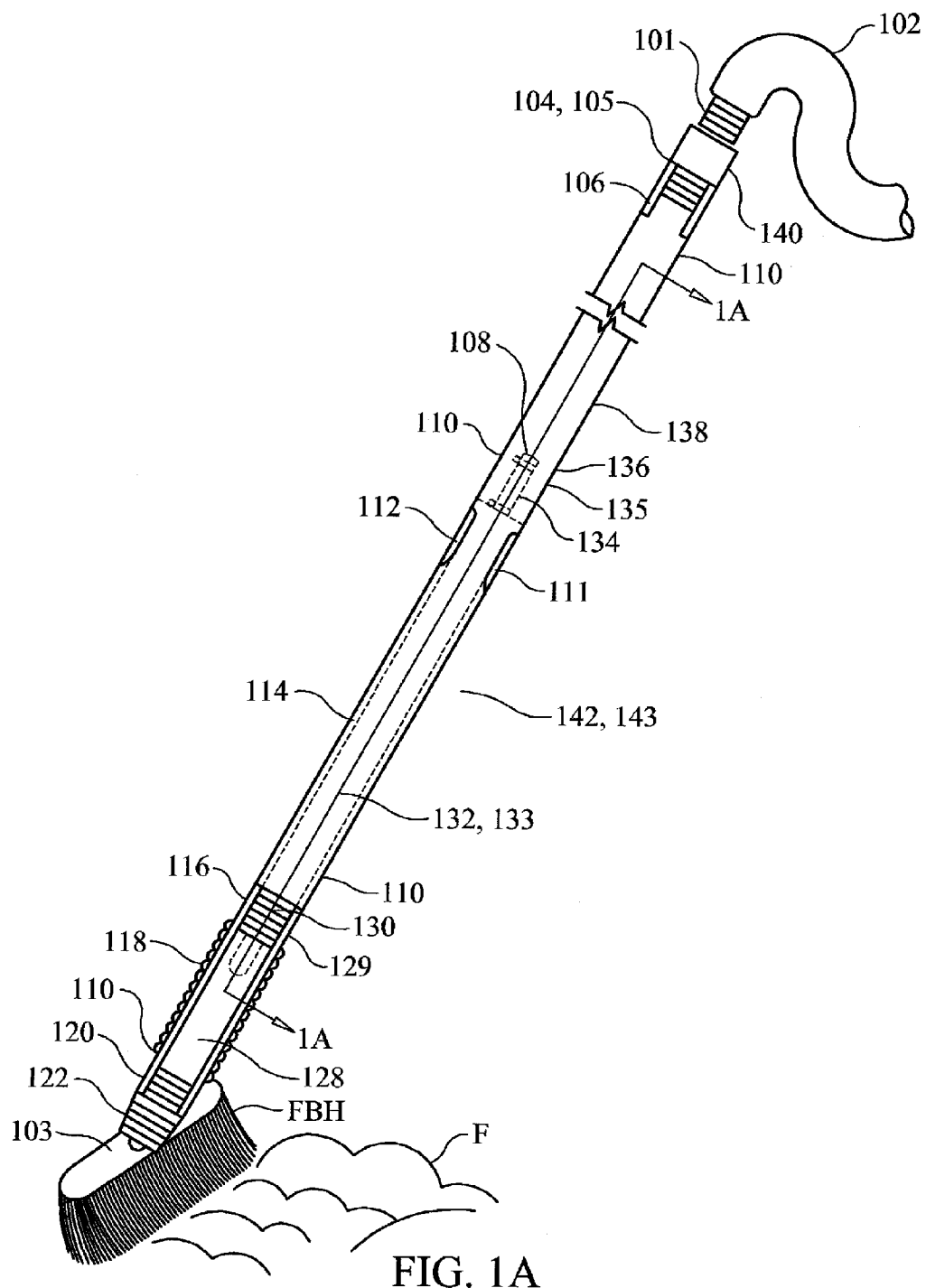
FIG. 1A illustrates a side view of a car wash foam brush handle, in accordance with one embodiment of the present invention.

FIG. 1A illustrates a side view of a car wash brush 100, in accordance with one embodiment of the present invention. The car wash foam brush handle 100 is typically utilized in a self-serve car wash that is typically unattended.

The car wash foam brush handle 100 has a proximal end 101 and a distal end 103 and is attached to a foam brush hose 102, a hose fitting 104, a crimping hose 106, a single roll pin 108, a plurality of seal crimps 110, a tubing cover 112, a compression spring 114, a wire braided hose 116, a flexible protection tube 118, a compressed ferrule 120, a brush head connector 122, a plurality of foam F, a foam brush head FBH, a flexible joint assembly 128, a piston guide 130, a piston rod 132, a centered piston aperture 134, a piston assembly 136, a cylindrical handle 138, a hose attachment fitting 140 and a brush handle 142.

The foam brush hose 102 is provided from an existing self-serve car wash and provides foam solution to the car wash brush 100. The hose fitting 104 removably attaches the foam brush hose 102 to the proximal end 101 of the car wash brush 100 and is an approximate ½ inch MIP×⅝ inch barb hex hose fitting 105, but can be any suitable hose fitting. The crimping hose 106 is an approximate ⅝ inch×4 inch crimping hose that is utilized in combination with the hose fitting 104 to secure the foam brush hose 102 to the car wash foam brush handle 100. The single roll pin 108 serves as a stainless steel piston rod retainer that can also be made of any other suitable material. The seal crimps 110 are a plurality of hydraulically compressed assembly and seal crimps that also include a pinch valve crimp 111. The tubing cover 112 is a PVC shrink tubing cover to protect and cover a portion of the car wash foam brush handle 100. The compression spring 114 is an approximate 11 inch stainless steel cylindrical compression spring that is protected and enclosed in the stainless steel cylindrical handle 138. The wire braided hose 116 receives the foam F and the piston rod 132 and is an approximate 6 inch flexible wire braided hose that can be any other suitable length. The flexible protection tube 118 is an ethylene propylene diene monomer (EPDM) annular spaced flexible protection tube that can be made of other suitable material as well. The compressed ferrule 120 provides strength and helps prevent the car wash foam brush handle 100 from leaking The brush head connector 122 is disposed on the distal end 103 of the car wash foam brush handle 100. The car wash foam brush handle 100 attaches to the replaceable foam brush head FBH that is supplied by others. FFThe foam brush head FBH is removably attached to the brush head connector 122 disposed on the distal end 103 of the car wash foam brush handle 100. The foam brush head FBH is a standard flow-thru brush and is supplied with foam FF. The flexible joint assembly 128 has a proximal end 129 and allows the foam brush head FBH to be unusable and flop around and is approximately 6 inches in length but can be any suitable length. The piston guide 130 is set at the proximal end 129 of the flexible joint assembly 128 and is approximately ⅝ inch in width and also serves as an assembly barb. The piston rod 132 extends into and through the flexible joint assembly 128 with the piston guide 130 to secure the foam brush head FBH in a rigid position to be used by a user. The piston rod 132 has a proximal end 135 and is an approximate 12 inch steel piston rod 133 but can be any suitable length. The centered piston aperture 134 is disposed on the proximal end 135 of the piston rod 132. The piston assembly 136 includes the piston guide 130, the piston rod 132 and the centered piston aperture 134 and controls the piston rod 132 movement into and through the flexible joint assembly 128 to secure the foam brush head FBH in a rigid position to be used by a user. Within 1 or 2 seconds the piston rod 132 is thrust through the pinch valve crimp 111. The foam F flows and has now locked the piston rod 132 and the centered piston aperture 134 into position through the piston guide 130 and progressed through the flexible joint assembly 128 and comes to rest inside of the brush head connector 122. The cylindrical handle 138 is disposed adjacently above the tubing cover 112 but below the crimping hose 106 and is grasped by a user to utilize the car wash brush 100. The cylindrical handle 138 is made of stainless steel but can be made of other suitable materials as well. The hose attachment fitting 140 is disposed adjacently above the crimping hose 106 but below the foam brush hose 102. The hose attachment fitting 140 is an approximate ½ inch MIP×⅜ inch FIP hose attachment fitting. The brush handle 142 includes an elongated portion 143 of the car wash brush 100 between the brush head connector 122 and the hose attachment fitting 140 that includes the cylindrical handle 138. The brush handle 142 is an approximate 41 inch in length stainless steel flow-thru handle. The brush handle 142 is also supplied with foam F.

The car wash foam brush handle attaches to a foam brush hose that already exist in a self-serve bay. The car wash foam brush handle also has a foam brush head (supplied by others) that attaches to the distal end of the useable portion on the car wash foam brush handle. There is no plurality of cotter pins. They have been replaced by a single stainless steel roll pin that attaches the piston head to the piston rod. The stainless steel cylindrical handle is a primary portion of the brush handle of the car wash foam brush handle. It is also the cylinder in which the piston head, rod, spring and roll pin slide back and forth. The polyolefin cover is cosmetic and acts as a grip for a human hand to hold the stainless steel portion of the brush handle.

Figure 1B:
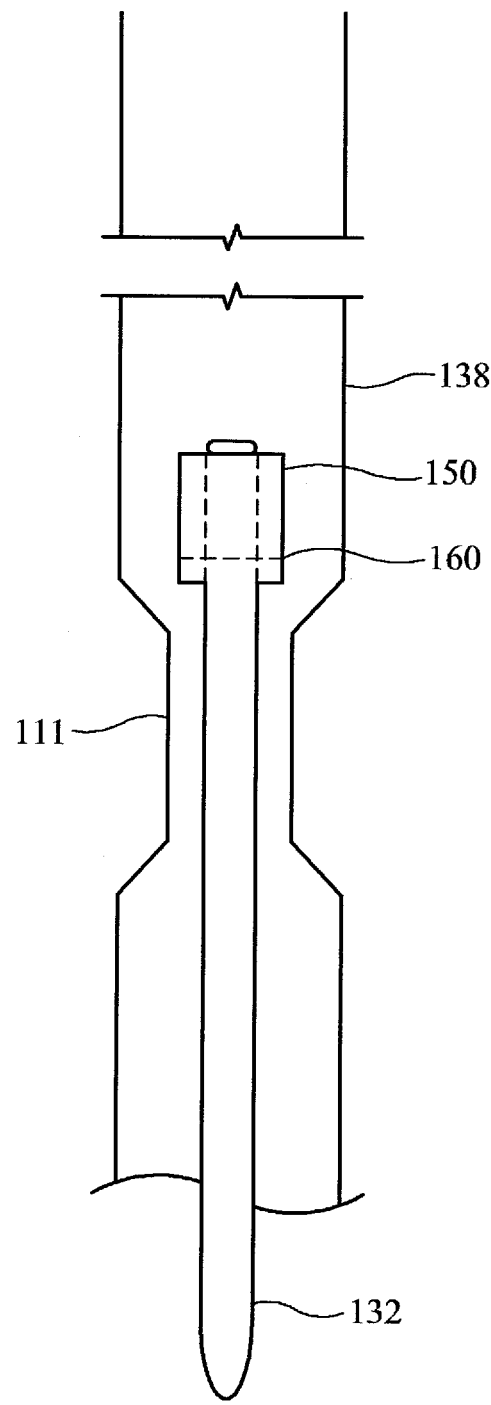
FIG. 1B illustrates a cross-sectional view of a piston assembly along line 1A-1A in FIG. 1A of a car wash foam brush handle, in accordance with one embodiment of the present invention.
Figure 3:
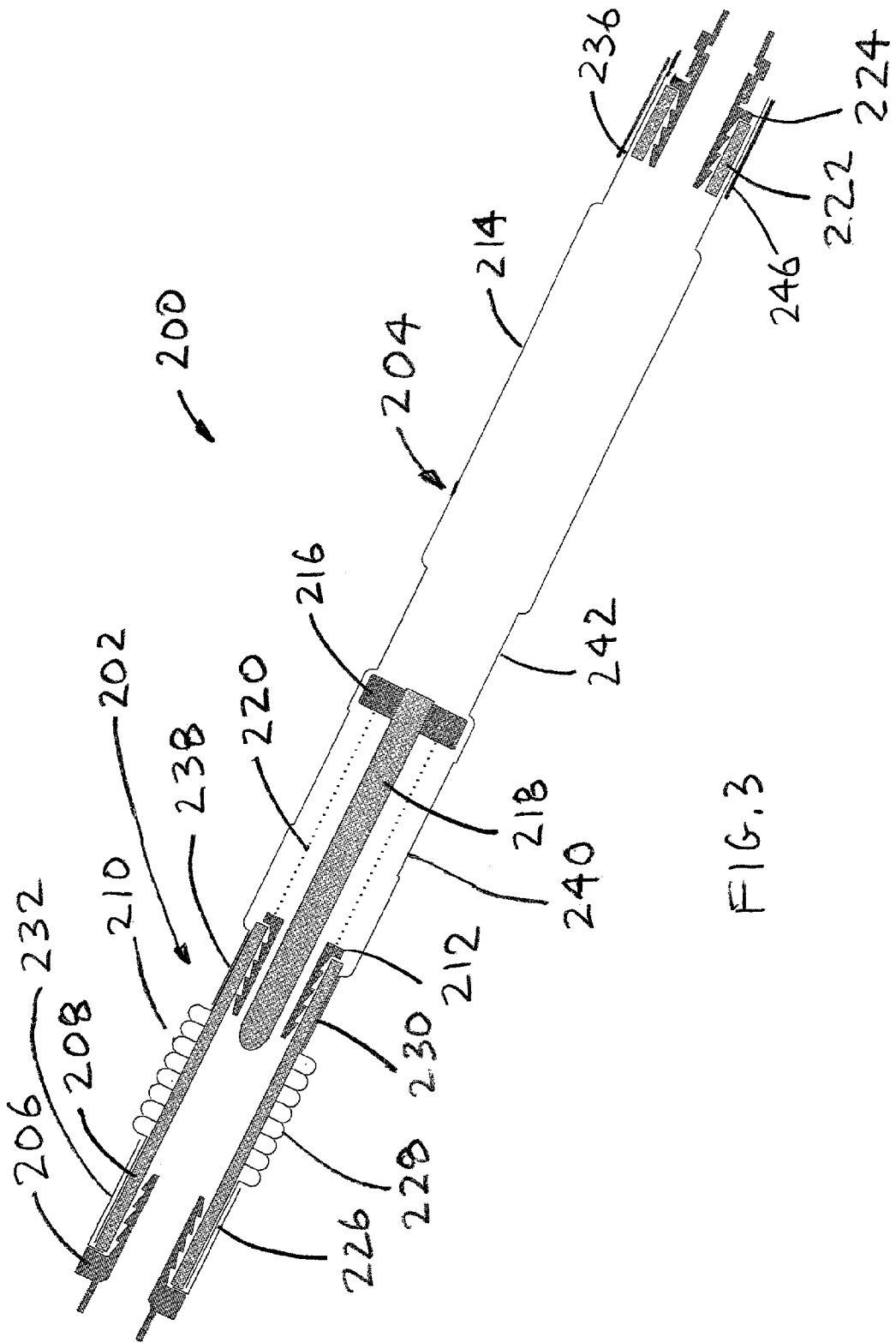
FIG. 3 is an enlarged cross sectional view of a car wash foam brush handle in accordance with the present invention.
Figure 4:
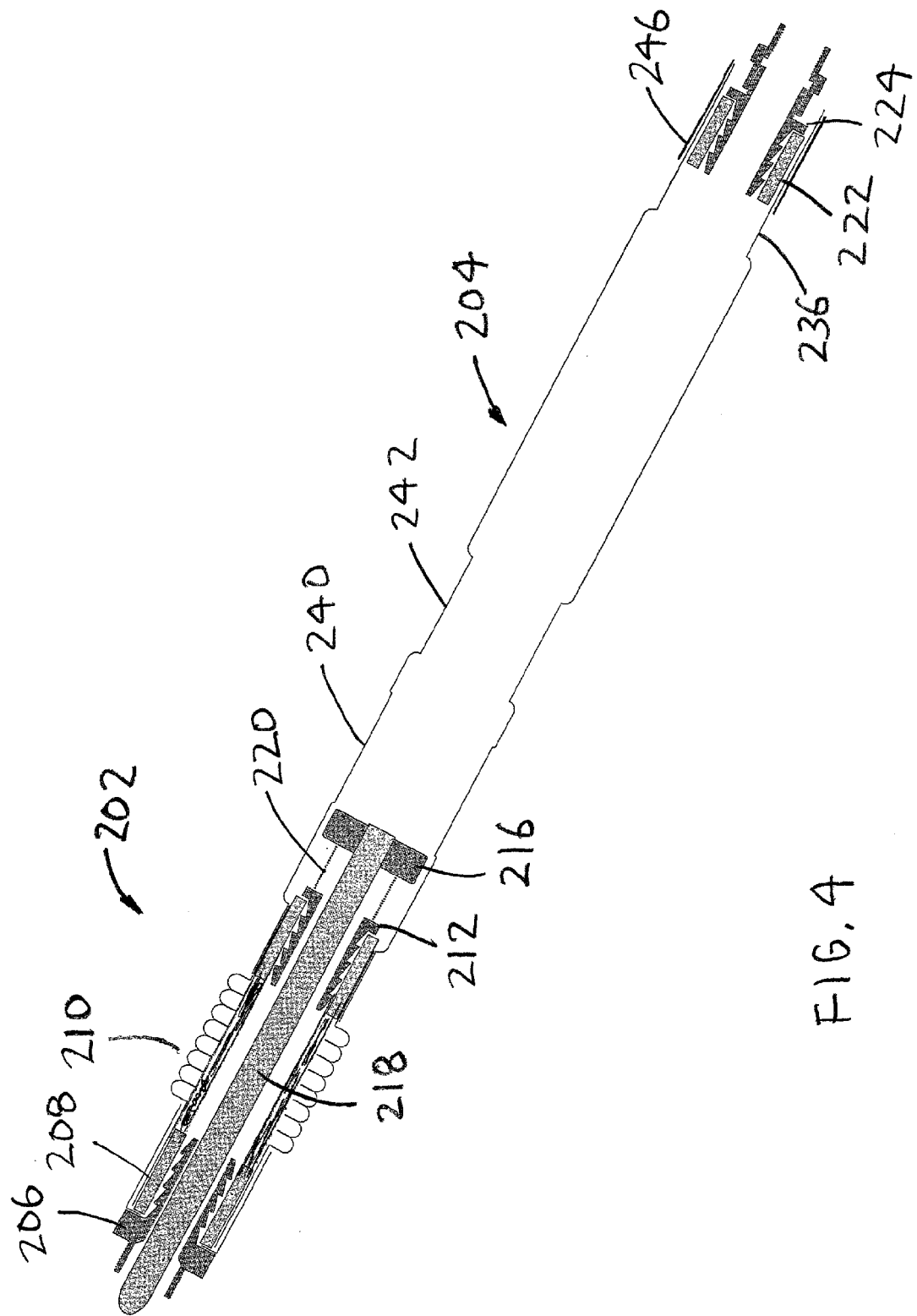
FIG. 4 is an enlarged cross sectional view of a car wash foam brush handle, while foam is flowing therethrough in accordance with the present invention.
Figure 5:
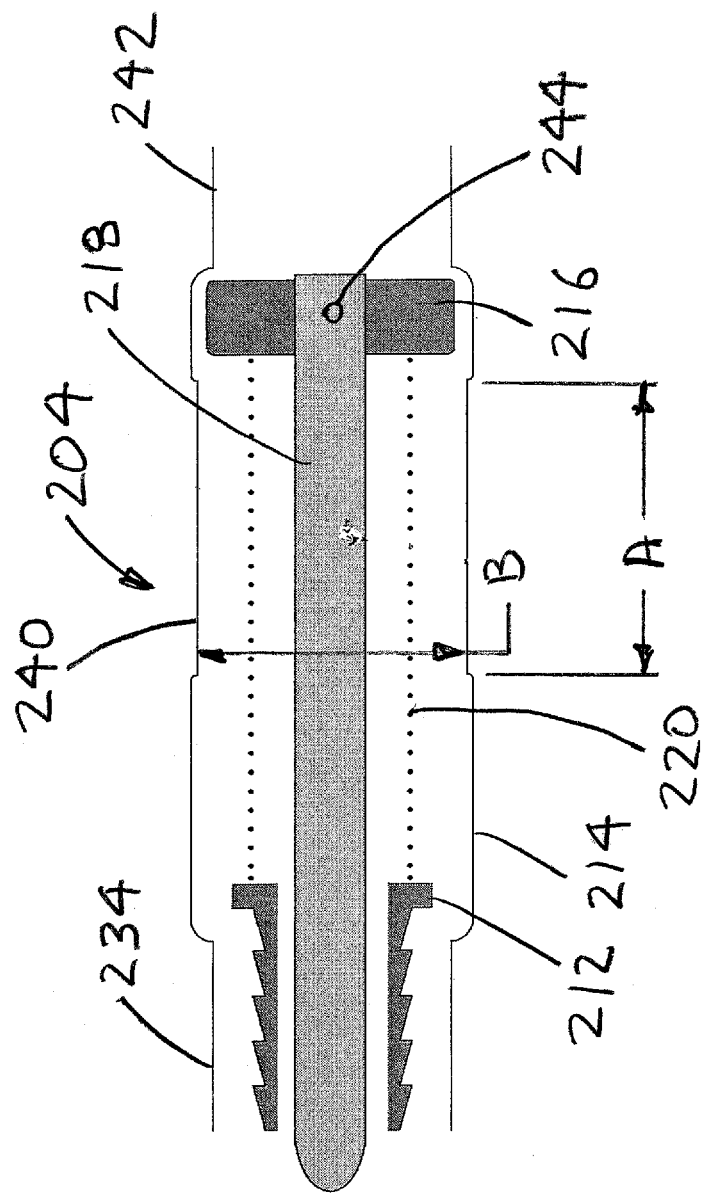
FIG. 5 is an enlarged cross sectional view of a portion of a piston tube of a car wash foam brush handle in accordance with the present invention.
Figure 6:
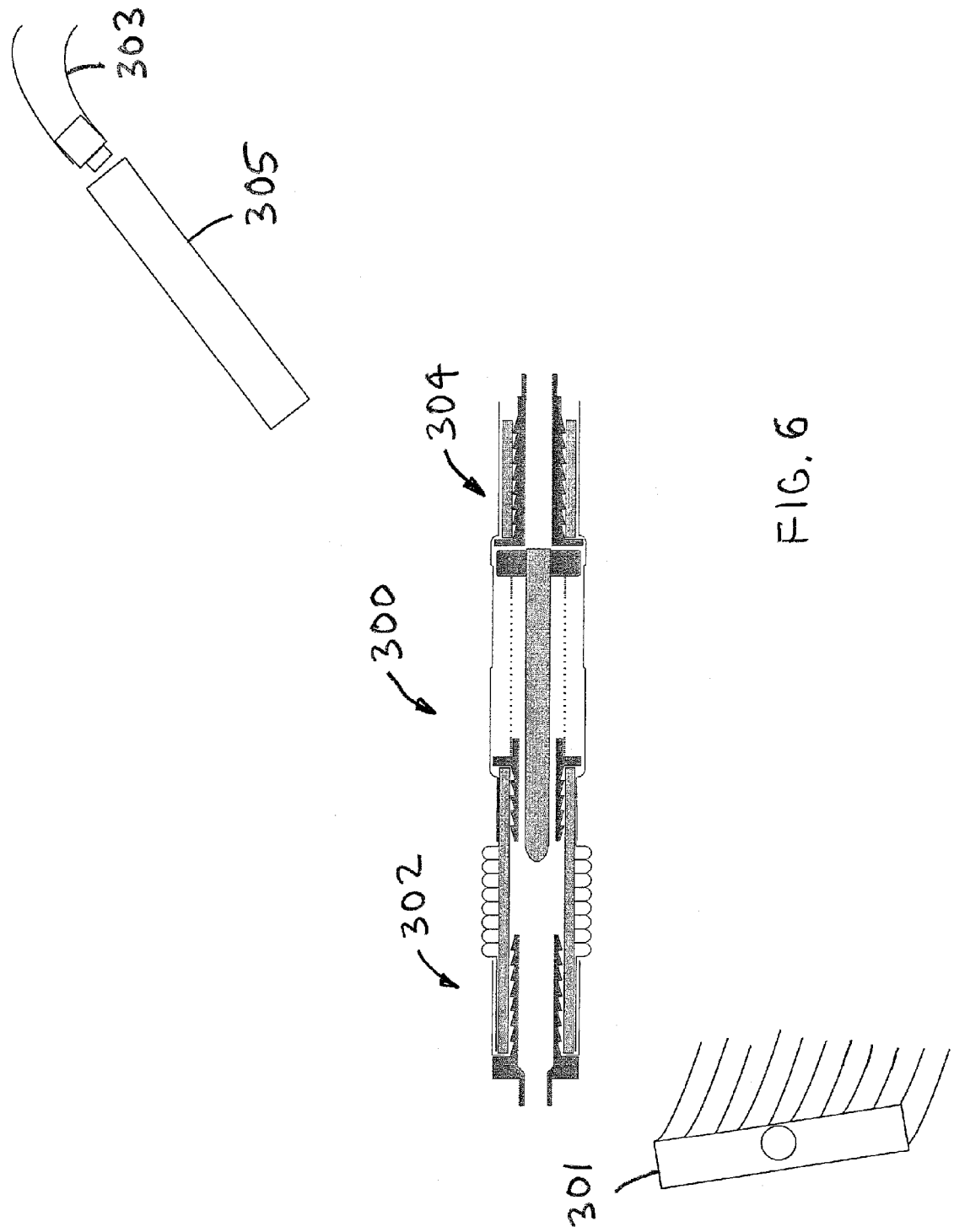
FIG. 6 is a partially exploded side view of a car wash water brush handle, a brush, a hand grip and a water hose in accordance with the present invention.
Figure 7:
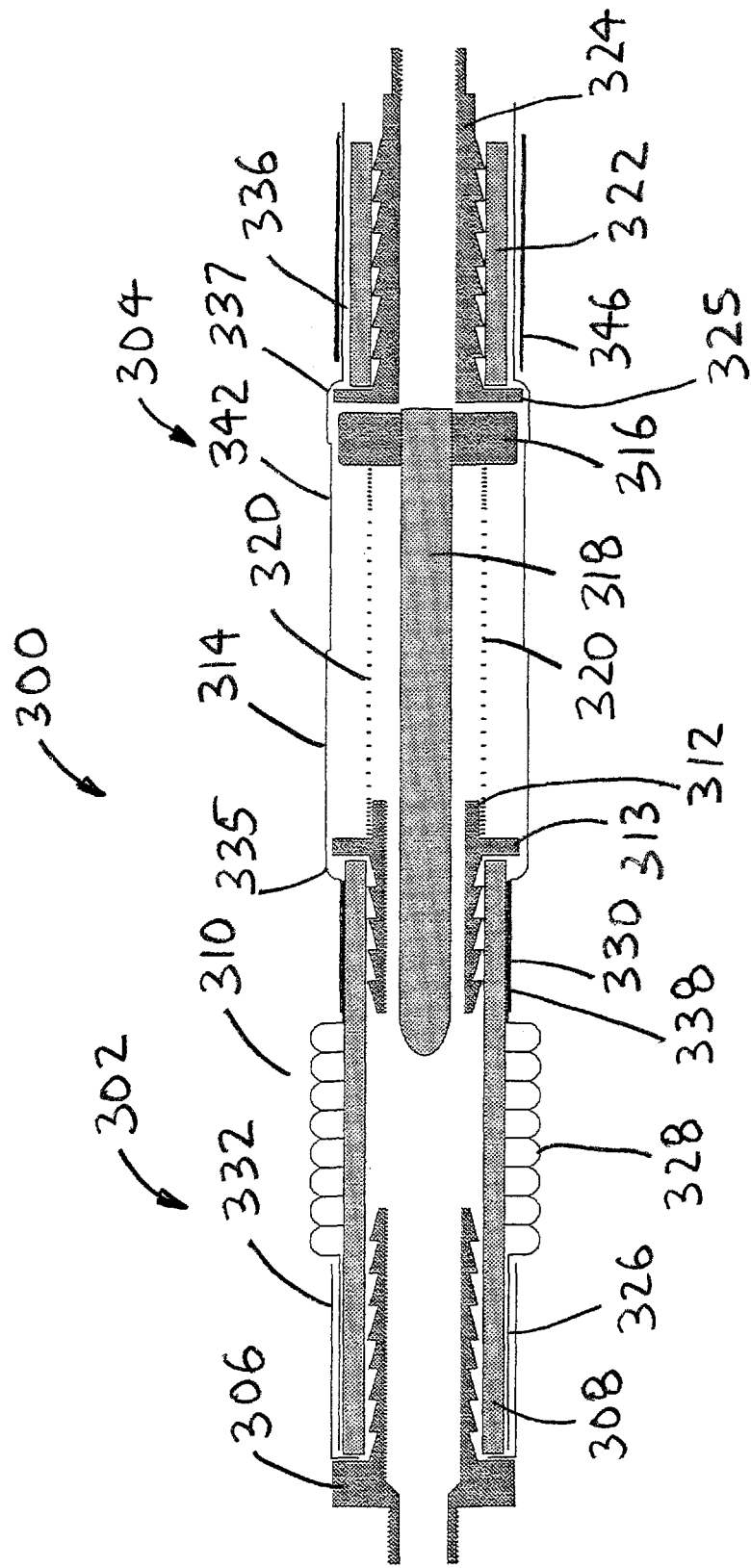
FIG. 7 is an enlarged cross sectional view of a car wash water brush handle in accordance with the present invention.
Figure 8:
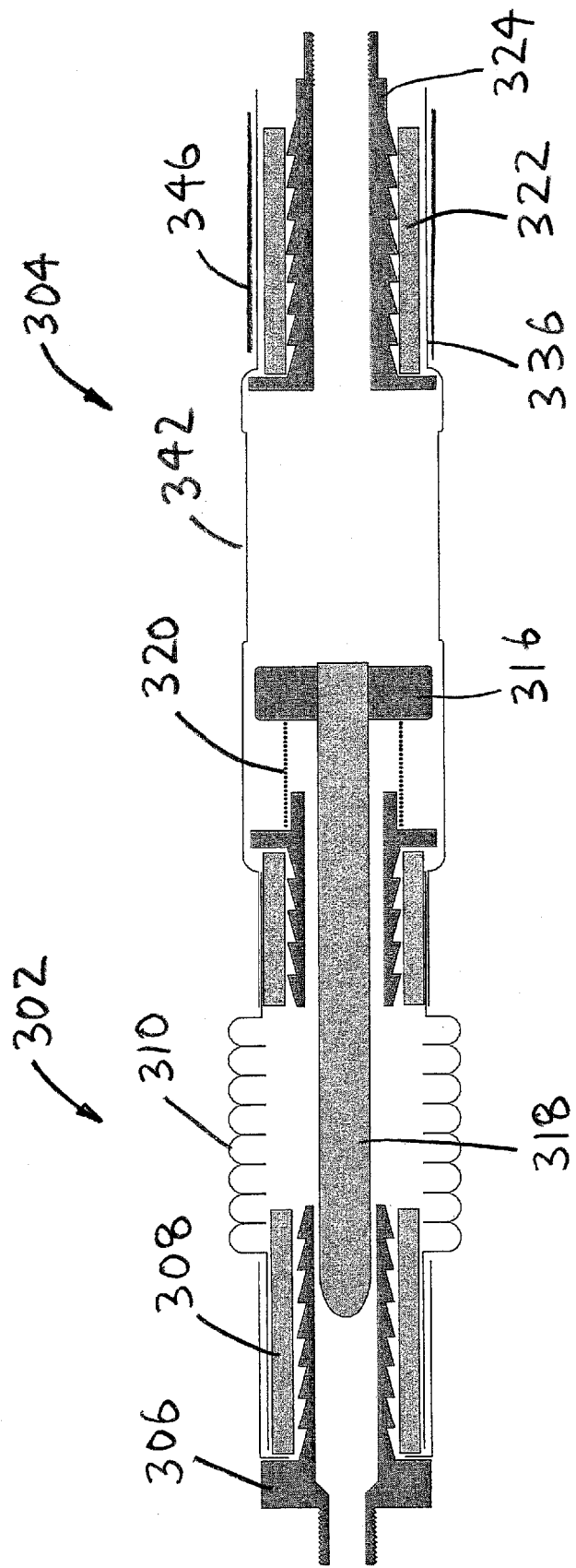
FIG. 8 is an enlarged cross sectional view of a car wash water brush handle, while water is flowing therethrough in accordance with the present invention.
Figure 9:
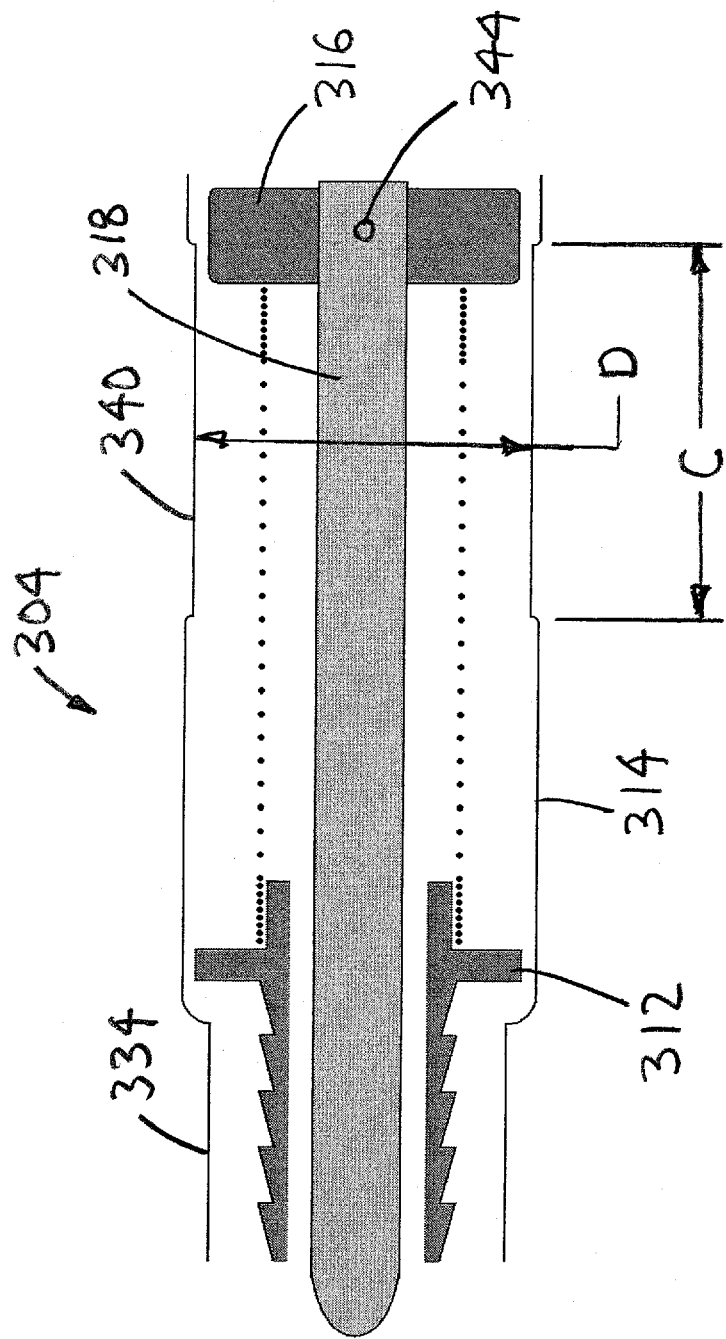
FIG. 9 is an enlarged cross sectional view of a portion of a piston tube of a car wash water brush handle in accordance with the present invention.

FIG. 1B illustrates a cross-sectional view of a piston assembly 136 along line 1A-1A in FIG. 1A of a car wash brush 100, in accordance with one embodiment of the present invention. The piston assembly 136 and car wash foam brush handle 100 are the same piston assembly 136 and car wash foam brush handle described and illustrated in FIG. 1A and its description. More specifically, the pinch valve crimp 111, the piston guide 130, the piston rod 132, the centered piston aperture 134 and the cylindrical handle 138 are the same pinch valve crimp 111, piston guide 130, piston rod 132, centered piston aperture 134 and cylindrical handle 138 described and illustrated in FIG. 1A and its description.

The piston assembly 136 has a proximal end 137 also includes a piston head 150 and a roll pin 160. The piston head 150 is disposed on the proximal end 137 of the piston assembly 136 and the piston rod assembly is pushed forward when foam F is generated through foam brush hose 102 as the car wash foam brush handle 100 is used as a "paid for" service. The roll pin 160 secures the piston head 150 to the piston rod 132.

The car wash foam brush handle has an approximate 35 inch in length stainless steel flow-thru handle with an additional 6" flexible joint and is a total of approximately 41 inches long. It is designed to have a standard (flow-thru) brush attached to the base of the handle by a fitting and is used in self-serve (coin-operated) car washes. A foam entrance end of a handle fitting is attached to a traditional foam brush hose and boom (not shown) in a bay of a self-serve car wash. The hose, handle and brush are supplied with foam by equipment that is located typically in a central equipment room within the self-serve car wash. The handle is rigid from the handle fitting to a middle piston guide fitting and a crimp. The rigid length of the cylindrical handle is approximately 35 inches in length and is attached by a fitting to the hose. The rigid tubular section of the car wash brush is described as the handle portion that a customer grips to use the foam brush supplied by others. The bottom approximate 6 inch portion of the handle is called a flexible joint assembly. The flexible joint assembly is the portion of the car wash brush that flexes, bends and flops in an unusable manner due to the weight of the brush that is attached to a brush head connector. As human scrubbing pressure is applied by a user at the handle and the customer attempts to utilize the brush assembly without payment, it becomes very difficult to accomplish a cleaning task. The customers must then decide if they are going to use the hose, brush and handle assembly to clean the vehicle properly and will then have to make a specified payment and select "Foam Brush" on a nearby timing meter. When the payment is made the foam begins to flow through the handle assembly. Within approximately the range of 1 to 2 seconds the extendable internal piston is extended through the pinch valve crimp. The foam has now locked the extendable internal piston and a push rod into position through the piston guide and progresses through the flexible joint assembly and comes to rest inside of the brush head connector.

All of the components of the car wash foam brush handle are assembled and hydraulically compressed in place at a plurality of necessary points of assembly. A plurality of hydraulic crimps are necessary for retaining one or more hoses, fittings and ferrules in position to prevent leaking. There are also one or more strategic crimps that serve as one or more compressed joints and as one or more internal stops of a piston and a spring movement. There is also a crimp that is a pinch valve that thrust the extendible internal piston and a piston rod forward in approximately the range of 1 to 2 seconds as the foam begins to flow. The piston rod assembly with the thrusting motion has to pass through a narrow passage way and back into a wider internal dimension that allows foam to flow around the extendible internal piston and still maintain the desired foam quality. The piston rod can also be a piston tube. As a piston tube, the foam would be balanced between the flow of the foam through the tube and the foam necessary to still push the piston tube forward to overcome a return compression spring. However, a substantial weakness within the handle occurs when designed with a tube and can be relatively easily bent even in a hardened state, which is why a piston rod is used.

The car wash foam brush handle is a foam-actuated mechanical device. Within the different branches of mechanical physics there are a variety of energies that cause motion. These energies in Newtonian Mechanics are fluid mechanics, hydraulics, classical mechanics, pneumatics, static, dynamics, kinetics, aerodynamics, kinematics, and aeromechanics. Within these energy distinctions of fluid mechanics there is no mention of foam as a physical energy for the movement of one or more physical bodies. The car wash foam brush handle utilizes the science of matter (foam) soap, water and air and energy (flow) and their interaction to cause movement without collapsing the quality, form and viscosity of the foam. To cause the mechanical movement of an extendible internal piston, which is being resisted by a compression return spring, foam must pass between the inside walls of a handle and the extendible internal piston. A precise tolerance that allows for the extendible internal piston and the piston rod movement is what enables the car wash foam brush handle to operate relatively well. Without the tolerances between the foam and the resistance of the return spring and the weight of the extendible internal piston and the piston rod, the car wash foam brush handle would compromise and reduce the quality of the foam that comes through the handle.

When the flexible joint assembly becomes rigid, the car wash foam brush handle becomes fully useful to a paying customer. The extendible piston rod assembly compresses a return spring down into a fully compressed state. The extendible piston rod has been pushed by the flow of the foam through the flexible joint assembly and locks the car wash foam brush handle into a useful state. The locked extendible piston rod continues to stay in position as the foam flows through the entire cylindrical tube and around the piston head and out through the foam brush head and bristles. At this point, resistance of the spring, the extendible internal piston and the piston rod are in relative precise balance. The balance is imperative to maintain relatively the desired quality, viscosity and form of the foam so that a customer can perform the task of safely brushing and cleaning their vehicle. When the customer's paid usage time expires, the flow of the foam stops. Within seconds of the flow stopping the foam begins to dissipate and the compressed return spring begins to push the piston rod assembly back out of the flexible joint and back to the home position crimp. The brush head and the flexible joint then goes back to simply flexing, bending and flopping back and forth rendering the brush back to an unusable condition. The customer then realizes usage time has expired and that it is necessary to insert additional payment to continue using and washing with the hose, brush and handle assembly or the customer will proceed to the next step of selecting "Rinse and/or Wax" from a nearby meter and complete cleaning their vehicle.

A high pressure single wire braided hose is provided that withstands flexing, bending and flopping of the attached brush and is an approximate ⅝ inch industrial 3000 PSI rated high pressure single wire braided hose although other suitable hoses can also be used. The high pressure single wire braided hose is inserted into an EDPM annular spaced flexible protection tube as a resistance tube that prohibits excessive over bending of the high pressure single wire braided hose. The EDPM annular spaced flexible protection tube also acts as a bumper protection when the brush is in proper use or when the brush is being improperly used and misused. The EDPM annular spaced flexible protection tube is also used cosmetically to give the appearance of a flexible joint and doubles as a piston rod guide and hose barb connector that causes the handle portion of the car wash brush and the high pressure single wire braided hose to become a single unit by connection with a hydraulic crimp. Similarly, the other end of the high pressure single wire braided hose has an approximate ½ inch MIP×approximate ⅝ inch hose barb attached by a hydraulically compressed ferrule. This assembly forms the flexible joint assembly of the car wash foam brush handle and supports the attached foam brush head and bristles.

The piston assembly components are installed in the approximate 12 inch bottom portion of the stainless steel rigid cylindrical handle. The inside portion of the handle acts as a cylinder in which the enclosed interior piston moves up and down. The piston rod is a hardened stainless steel piston rod that has been designed to withstand more than approximately 300 pounds of bending pressure without distortion although other suitable steel piston rods can be used. The handle can be utilized as a lever and can be used to force bending on the piston rod to destroy the car wash foam brush handle. The approximate 11 inch stainless steel compression spring is inserted in the handle's piston cylinder portion and causes the return function of the piston rod and the piston assembly. The compression spring is designed to return the weight of the piston rod assembly back to a resting position after the foam has ceased to flow and begins to dissipate. The spring and piston rod assembly as a complete unit are also designed to compress and allow the piston rod assembly to protrude into the flexible joint assembly and protrude fully into a fitting brush head connector. The tolerance of balance regarding the weight of the piston rod assembly and the spring resistance are relatively precise. Because of the precision, the flow of the foam is capable of pushing the piston rod assembly forward and into a locked position that still maintains the foam quality that is desired. Once the foam has passed through the pinch valve the gap around the piston and the inside of the cylindrical handle widens to approximately 0.025 inches. The precise gap measurement allows for the flow of the foam to push on the top of the piston head with enough pressure to move the piston forward. Simultaneously foam is also flowing between the piston and the cylinder wall to allow the full flow capacity, the viscosity, quality and form of the foam to continue a path through the high pressure single wire braided hose and finally to a plurality of brush bristles. The double function of the flow of the foam (pushing the piston forward and also passing around the outside of the piston itself) is what causes the car wash foam brush handle to work with the foam. Without these precise tolerances of the flow of foam, gaps, weight and spring capacities, there would be a collapsing of the foam into a plurality of soapy bubbles and water. The collapse of the quality of foam would directly affect the results, the operation and the integrity of the car wash foam brush handle. The foam is supposed to be suitable in viscosity and form and lubricity as to do no harm to the finish of a vehicle being cleaned.

The car wash foam brush handle includes an array of beneficial features. The problems of misuse and abuse of the foam brush system are many. The conventional car wash brush has proven itself to be an important device for a self-serve car wash owner. Once a customer is in a bay of a self-serve car wash the customer becomes in control of the space, time and use of the bay and the car wash brush. With a car wash foam brush handle installed in a bay, the customer becomes encouraged to make a payment and use the brush properly for the brush's intended purpose. The vehicle being cleaned by the car wash foam brush handle and brush has the proper lubrication, detergent and automatic flushing necessary to do a cleaning task safely and properly.

The traditional car wash foam brush handle is rigid and useful for many unpaid for purposes, is useful as a broom for sweeping pick-up truck beds, is useful for pushing snow off vehicles, is useful for detail cleaning with foam loaded on a vehicle, is useful for high pressure and foam brush tag team users, is useful for wheels and chrome cleaning purposes, is useful for cleaning with weep water running, can cause confrontations between a customer and an owner of a self-serve car wash, produces low quality soap bubbles and poor results, does not require payment for use, accumulates dirt on an improperly used brush head, produces a situation where a customer may not have lubrication of soap, produces a situation where a vehicle surface can be scratched, does not encourage proper use of the brush, has no lock out to customer for improper use, wastes a customer's time in the bay, results in unnecessary wear and tear to the brush head, results in a customer's perception of the car wash brush value is reduced, utilizes thirty year old technology that is unchanged, results in no change in income from an existing handle, results in approximately a 5% annual loss of income per bay, utilizes fragile PVC or aluminum material that easily breaks, doesn't always withstand solid freeze conditions and has a continuous cost of ownership by virtue of lost revenue and time wasted in the bays. The self-serve car wash is a time sensitive business.

The car wash foam brush handle wobbles and is useless until money is inserted, is virtually useless as a push broom, is difficult for pushing snow off a vehicle, is useless for cleaning with time expired, is useless for dry tag team user purposes, is useless for cleaning wheels without payment, is useless for cleaning with weep water, utilizes a passive and polite approach to proper use, utilizes high quality foam and customer satisfaction, requires payment for proper use, has a brush head that is continually flushed and cleaned, makes a customer always have the brush head lubricated, safely cleans without scratching a vehicle surface, retrains a customer in proper use, can lock out a customer for improper use, has a customer pay for time and use, causes relatively normal wear and tear to brush head, foam brush value is enhanced, increases income and profit potential, results in approximately up to 5% or more annual income increase per bay, has all stainless steel and brass construction, has proven to withstand solid freeze and provides a continuous return on investment.

There are numerous ways to manufacture the car wash foam brush handle and there are a variety of materials that can be utilized. The car wash foam brush handle can be made as one complete sealed unit by virtue of assembling the plurality of components and hydraulically compressing (crimping) them together. However, the car wash foam brush handle could be made to screw together in segments with a plurality of machined seals, seats, O-rings or other suitable components. The car wash foam brush handle can be assembled in plastic, a variety of metals, carbon fiber materials or other suitable materials. The car wash foam brush handle also is made for adaptability, capable of being used with most car wash foam brush systems, brushes and detergents. The car wash foam brush handle is built to be sustainable and capable of withstanding self-serve car wash use, misuse and abuse. The car wash foam brush handle is designed to withstand being run over by a vehicle and still function properly and without leaking. The car wash foam brush handle is designed, tested and proven to withstand solid water freezing and still function once it has thawed and without rupture or leaking and has been designed to give a buyer a rapid return on investment by getting paid for their self-serve car wash services.

The elements of the car wash foam brush handle can be reconfigured to utilize other methods of flexing and locking the handle and could involve an array of mechanical joints, locking devices, air, liquid, electrical, magneto type or other suitable processes that would result in making the car wash foam brush handle "locked out" until such time that payment is made for the services rendered. However, the car wash brush foam handle is activated by foam and having designed the car wash foam brush handle to be powered by the medium in which it is dispensing is what makes the car wash foam brush handle well-suited for a self-serve car wash. The car wash foam brush handle is foam activated and is fully adaptable to most foam brush systems on the market today and does not require a buyer to purchase or install any other additional equipment. The handle is designed to remove the old rigid flow through foam brush handle and replace it with the new foam activated mechanical car wash foam brush handle.

A paying self-serve customer would use the car wash foam brush handle the same way as using a current rigid flow-thru foam brush handle. The customer would insert their payment and select "Foam Brush" on the timing meter. The car wash foam brush handle would be seamless to a regular paying customer, however to a nonpaying customer who finds various ways to misuse and abuse the car wash brush, they would be locked out from doing so. That customer through the passive and polite approach that the car wash foam brush handle presents, will begin to change his habits and be re-trained in the proper use of the car wash brush. They will over time begin to understand that to utilize the foam brush for the sole purpose of cleaning their vehicle properly they must insert payment and select "Foam Brush" on a nearby timing meter. Once the payment has been made the car wash foam brush handle becomes rigid and useful like any other conventional handle and can safely and effectively brush their vehicle clean. The car wash operator can be relatively certain that his income will increase along with profits and waste time practices in the bays of their self-serve car wash will diminish.

Foam activated devices have not been known to cause mechanical movements. There are many types of "foam generating" devices such as the car wash foam brush systems, however, utilizing foam to cause a mechanical movement of a component such as a piston, turbine, impeller, magneto or other suitable component has not been done. Also, the existing rigid foam brush handles on the market are useful with or without payment due to their relatively simple design. Because the self-serve car wash customer decides if and when he will pay for the use of a car wash brush, the car wash foam brush handle remains "virtually useless" until payment has been made. The car wash foam brush handle does not require any outside locking devices or additional equipment to function. The car wash foam brush handle only requires a car wash owner to operate his foam brush system within normal operating parameters that are standards of the car wash equipment industry. The car wash foam brush handle also assures a self-serve customer of being able to safely wash their vehicle with the proper amount of lubrication between the brush bristles and the delicate clear coat paint on today's automobiles. The car wash foam brush handle also assures each customer that the brush is clean and ready for use by virtue of the fact that it has been used properly by the preceding customer. In other words, the brush was constantly being flushed by the foam and no residual dirt or abrasives were left on the brush. The car wash foam brush handle solves a dilemma that self-serve car wash operators have faced for approximately over 30 years and provides a solution to stop the misuse and abuse of foam brush car wash equipment.

With reference to FIGS. 2-5, a car wash foam brush handle 200 includes a wobble tube 202 and a piston tube 204. The wobble tube 202 includes an entrance hose fitting 206, a reinforcing hose 208, a flexible boot 210 and an exit hose fitting 212. The piston tube 204 includes a tube body 214, a piston 216, a piston rod 218, a compression spring 220, an exit reinforcing hose 222 and an exit hose fitting 224. The reinforcing hose 208 is preferably a wire braided hose. The flexible boot 210 includes a first tube end 226, a flexible portion 228 and a second tube end 230. The reinforcing hose 208 is inserted into the flexible boot 210. The entrance hose fitting 206 is inserted into one end of the reinforcing hose 208 and the exit hose fitting 212 is inserted into the other end of the reinforcing hose 208. The entrance hose fitting 206 and the first tube end 226 are secured to the one end of the reinforcing hose 208 by crimping a first crimp sleeve 232. The tube body 214 includes a first tube end 234 and a second tube end 236. The exit hose fitting 212, the first tube end 234 and the second tube end 230 are secured to the other end of the reinforcing hose 208 by crimping a second crimp sleeve 238.

A first crimp or first pinch valve 240 is formed one end of the tube body 214. The pinch valve 240 has a length "A" and an inner diameter "B." The length "A" is preferably 2.75 inches and the inner diameter "B" is preferably 1.136 inches. The piston 216 preferably has an outer diameter of 1.100 inches. The clearance on each side of the piston 216 is preferably 0.018 inches. A second crimp 242 is formed in the tube body 214 to prevent forward travel of the piston 216. The piston 216 is preferably attached to the piston rod 218 with a pin 244. The compression spring 220 is disposed between the piston 216 and the exit hose fitting 212. A solid length of the compression spring 220 is chosen, such that the piston rod 216 extends out an end of the entrance hose fitting 206. The exit hose fitting 224 and the second tube end 236 are secured to the one end of the exit reinforcing hose 222 by crimping a third crimp sleeve 246. When foam flows through the tube body 214, the piston rod 218 is forced into entrance hose fitting 206 through pressure against the piston 216. The piston rod 218 prevents the flexible portion 228 of the flexible boot 210 from being damaged during operation. The foam flows through the tube body 214 at a pressure of 50 psi. A brush head 201 is threaded on to the exit hose fitting 224 and a foam hose 203 is threaded on to the entrance hose fitting 206. An entire length of the car wash foam brush handle 200 is preferably covered with a PVC shrink wrap tube (not shown). The car wash foam brush handle 200 is preferably 42 inches long.

With reference to FIGS. 6-9, a car wash foam brush handle 300 includes a wobble tube 302 and a piston tube 304. The wobble tube 302 includes an entrance hose fitting 306, a reinforcing hose 308, a flexible boot 310 and an exit hose fitting 312. The piston tube 304 includes a tube body 314, a piston 316, a piston rod 318, a compression spring 320, an exit reinforcing hose 322 and an exit hose fitting 324. The reinforcing hose 308 is preferably a wire braided hose. The flexible boot 210 includes a first tube end 326, a flexible portion 328 and a second tube end 330. The reinforcing hose 308 is inserted into the flexible boot 310. The entrance hose fitting 306 is inserted into one end of the reinforcing hose 308 and the exit hose fitting 312 is inserted into the other end of the wobble reinforcing hose 308. The entrance hose fitting 306 and the first tube end 326 are secured to the one end of the reinforcing hose 308 by crimping a first crimp sleeve 332.

The exit hose fitting 312 includes an exit flange 313 and the exit hose fitting 324 includes an exit flange 325. The exit hose fitting 312 is inserted into one end of the tube body 314 and the exit hose fitting 324 is inserted into the other end of the exit hose fitting 312. A first tube end 334 is formed on the one end of the tube body 314, after insertion of the exit hose fitting 312. The first tube end 334 forms a first corner 335 in the tube body 314, which retains the exit flange 313 of the exit hose fitting 312. The exit hose fitting 312, the first tube end 334 and the second tube end 326 are secured to the other end of the reinforcing hose 308 by crimping a second crimp sleeve 338. A second tube end 336 is formed on the other end of the tube body 314, after insertion of the exit hose fitting 324. The second tube end 336 forms a first corner 337 in the tube body 314, which retains the exit flange 325 of the exit hose fitting 324. A first crimp or first pinch valve 340 is formed one end of the tube body 314. The pinch valve 340 has a length "C" and a diameter "D." The length "C" is preferably 2.75 inches and the inner diameter "D" is preferably 1.124 inches. The piston 316 has a preferably outer diameter of 1.100 inches. The clearance on each side of the piston 316 is preferably 0.012 inches. A second crimp 342 is formed in the tube body 314 to prevent forward travel of the piston 316. The piston 316 is preferably attached to the piston rod 318 with a pin 344. The compression spring 320 is disposed between the piston 316 and the exit hose fitting 312.

A solid length of the compression spring 320 is chosen, such that the piston rod 316 extends into the entrance hose fitting 306 at least 1.5 times a diameter of the piston rod 318. The solid length of the compression spring 320 is about double the solid length of the compression spring 220. The exit hose fitting 324 and the second tube end 336 are secured to the exit reinforcing hose 322 by crimping a third crimp sleeve 346. When water flows through the tube body 314, the piston rod 318 is forced into entrance hose fitting 306 through pressure against the piston 316. The piston rod 318 prevents the flexible portion 328 of the flexible boot 310 from being damaged during operation. The water flows through the tube body 314 at a pressure of 90 psi. A brush head 301 is threaded onto the exit hose fitting 324. A water hose 303 is threaded into one end of a hand grip tube 305 and the entrance hose fitting 206 is threaded into the other end of the hand grip tube 305. An entire length of the car wash water brush handle 300 is preferably covered with a PVC shrink wrap tube (not shown). The car wash water brush handle 300 is preferably 18 inches long.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

We claim:

1. A car wash water brush handle comprising:
 a piston tube includes a tube body, a piston and a piston rod, said piston rod extends from said piston, said piston is retained in said tube body; and
 a wobble tube includes a flexible boot and a reinforcing hose, said reinforcing hose is inserted into said flexible boot, one end of said wobble tube is removably attachable to a water hose, the other end of said wobble tube is attached to one end of said tube body, wherein said piston rod is pushed into said wobble tube when water flows through said piston tube.

2. The car wash water brush handle of claim 1, further comprising:
 a compression spring for biasing said piston rod away from said wobble tube.

3. The car wash water brush handle of claim 1 wherein:
 a reduced inner diameter is formed in said piston tube, at least a portion of said piston is located in said reduced inner diameter before water flows through said piston tube.

4. The car wash water brush handle of claim 3 wherein:
 a clearance between an outer diameter of said piston and said reduced inner diameter of said piston tube is about 0.012 inches.

5. The car wash water brush handle of claim 1 wherein:
 said car wash water bush handle is operated at a pressure of 90 psi.

6. The car wash water brush handle of claim 1, further comprising:
 an entrance hose fitting is retained in one end of said reinforcing hose.

7. The car wash water brush handle of claim 1 wherein:
 an exit hose fitting is retained in the other end of said reinforcing hose.

* * * * *